United States Patent
Emberty et al.

(10) Patent No.: US 7,337,246 B2
(45) Date of Patent: Feb. 26, 2008

(54) APPARATUS, SYSTEM, AND METHOD FOR QUICK ACCESS GRID BUS CONNECTION OF STORAGE CELLS IN AUTOMATED STORAGE LIBRARIES

(75) Inventors: Robert George Emberty, Tucson, AZ (US); Nils Haustein, Zornheim (DE); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 10/896,542

(22) Filed: Jul. 22, 2004

(65) Prior Publication Data

US 2006/0020680 A1      Jan. 26, 2006

(51) Int. Cl.
*G06F 3/00* (2006.01)
*G06F 13/12* (2006.01)
*G06F 7/00* (2006.01)
*G06F 13/00* (2006.01)

(52) U.S. Cl. .............................. 710/36; 710/5; 710/62; 700/214; 711/100

(58) Field of Classification Search ...................... None
See application file for complete search history.

(56) References Cited

U.S. PATENT DOCUMENTS

| | | | |
|---|---|---|---|
| 5,455,409 A | 10/1995 | Smith et al. | ................. 235/385 |
| 5,883,864 A * | 3/1999 | Saliba | ........................ 360/92 |
| 6,195,007 B1 | 2/2001 | Takayama et al. | ........ 340/572.1 |
| 6,600,967 B2 | 7/2003 | Milligan et al. | ............. 700/214 |
| 6,957,291 B2 * | 10/2005 | Moon et al. | ................. 710/302 |
| 2002/0114096 A1 | 8/2002 | Gardner, Jr. et al. | .......... 360/69 |
| 2002/0161984 A1 * | 10/2002 | Lloyd-Jones | ................ 711/203 |
| 2003/0089809 A1 | 5/2003 | Maekawa et al. | ......... 242/332.4 |
| 2003/0179485 A1 | 9/2003 | Kato et al. | ..................... 360/69 |
| 2003/0183715 A1 | 10/2003 | Hiraguchi | .................... 242/348 |
| 2003/0188304 A1 * | 10/2003 | Goodman et al. | ........... 717/171 |
| 2003/0235000 A1 | 12/2003 | Takayama | ..................... 360/69 |
| 2005/0216671 A1 * | 9/2005 | Rothman et al. | ............ 711/137 |

OTHER PUBLICATIONS

IBM Technical disclosure Bulletin, "Auto-Locator for Compact Disk-Read only Memory Storage Cases", vol. 39 No. 02 Feb. 1996.

* cited by examiner

*Primary Examiner*—Alan S. Chen
(74) *Attorney, Agent, or Firm*—Kunzler & McKenzie

(57) ABSTRACT

An apparatus, system, and method are disclosed for quick access of stored removable storage media. The apparatus includes an automated data storage library, a communications processor, and a media interface module. The automated data storage library has a plurality of storage cells, each storage cell having a media interface module for communicating with removable storage media. The communication processor module communicates with the media interface module of each storage cell. A grid bus couples the media interface module and the communication processor module. The system includes a storage area network coupling multiple hosts to at least one automated data storage library. The method includes communicating with the removable storage media, communicating with the media interface modules, and coupling the media interface modules to the communication processor module.

20 Claims, 10 Drawing Sheets

APPARATUS, SYSTEM, AND METHOD FOR QUICK ACCESS GRID BUS CONNECTION OF STORAGE CELLS IN AUTOMATED STORAGE LIBRARIES

BACKGROUND OF THE INVENTION

1. Field of the Invention

This invention relates to automated data storage libraries and more particularly relates to an automated data storage library configured to read removable storage media cartridge information in a storage cell and to interconnect the storage cells in order to make the cartridge information available to the library management.

2. Description of the Related Art

Automated data storage libraries are known for providing cost effective storage and retrieval of large quantities of data. The data in automated data storage libraries is stored on removable storage media that are, in turn, stored on storage shelves or the like inside the library in a fashion that renders the media, and its resident data, accessible for physical retrieval. Such media is commonly termed "removable media." Removable storage media may comprise any type of media on which data may be stored and which may serve as removable media, including but not limited to magnetic media (such as magnetic tape or disks), optical media (such as optical tape or disks), holographic media, electronic media (such as PROM, EEPROM, flash PROM, Compactflash™, Smartmedia™, Memory Stick™, etc.), or other suitable media. Typically, the data stored in automated data storage libraries is resident on removable storage media that is contained within a cartridge and referred to as a removable storage media cartridge. An example of a removable storage media cartridge that is widely employed in automated data storage libraries for mass data storage is a magnetic tape cartridge.

In addition to removable storage media, automated data storage libraries typically contain data storage drives that store data to, and/or retrieve data from, the removable storage media. The transport of removable storage media between data storage shelves and data storage drives is typically accomplished by one or more robot accessors or pickers (hereinafter termed "accessors"). Such accessors have grippers for physically retrieving the selected removable storage media from the storage shelves within the automated data storage library and transport such media to the data storage drives by moving in the X and/or Y directions. Depending on the library design, more complicated movement may include a Z direction and even radial movements of the gripper.

However, while the removable storage media is stored on the shelf or storage cell, the data is inaccessible. Currently, there are no electronics in the storage cell for monitoring the contents of the removable storage media. Thus, whenever the slightest bit of information is needed, the removable storage media must be physically moved from the storage cell to the data storage drive to be mounted and accessed. This is a time consuming process that requires the resources of the robotic accessors and therefore slow read and write requests from a host machine. Simple maintenance operations such as media inventory or reading the directory require that every removable storage media be removed from the storage cell and placed in an available drive to be accessed. Depending on the number of available accessors and drives, the inventory may cause the automated storage library to go offline for several hours.

From the foregoing discussion, it should be apparent that a need exists for an apparatus, system, and method for quick access of removable storage media in storage cells. Beneficially, such an apparatus, system, and method would query the removable storage media without removing the removable storage media from the storage cell.

SUMMARY OF THE INVENTION

The present invention has been developed in response to the present state of the art, and in particular, in response to the problems and needs in the art that have not yet been fully solved by currently available automated data storage systems. Accordingly, the present invention has been developed to provide an apparatus, system, and method for quickly accessing stored removable storage media that overcome many or all of the above-discussed shortcomings in the art.

The apparatus to quickly access stored removable storage media is provided with a logic unit containing a plurality of modules configured to functionally execute the necessary steps of removable storage media access. These modules in the described embodiments include an automated data storage library having a plurality of storage cells configured to engage removable storage media, each storage cell having a media interface module configured to communicate with the removable storage media, a communication processor module configured to communicate with the media interface module of each storage cell, and a communications network configured to couple the media interface modules and the communication processor module.

The invention may also include a physical connection configured to interface with a second physical connection of the removable storage media. In one embodiment, the physical connection may comprise an RS-232 standard interface connection, or a radio frequency (RF) module coupled to the communications network and configured to communicate wirelessly with a second RF module in the removable storage media. In a further embodiment, the communication processor is further configured to selectively transmit and receive unique identifying information for each removable storage media.

The media interface module may be configured to monitor the communications network and transmit an acknowledgement to the communication processor module in response to received unique identifying information.

The system to communicate with stored removable storage media comprises an automated data storage library, a host configured to communicate a data access request to the data storage library, a first accessor and a second accessor within the data storage library, the first and second accessors configured to facilitate the data access request, the automated storage library having a plurality of storage cells configured to engage removable storage media, each storage cell having a media interface module configured to communicate with the removable storage media, a communication processor module configured to communicate with the media interface module of each storage cell, and a communications network configured to couple the media interface modules and the communication module.

A method of the present invention is also presented. The method in the disclosed embodiments substantially includes the steps necessary to carry out the functions presented above with respect to the operation of the described apparatus and system. In one embodiment, the method includes communicating with removable storage media, communicating with a plurality of media interface modules, each media interface module coupled to a storage cell, and coupling the media interface modules and a communication processor module. The method may also include wirelessly coupling the media interface module to the communications network.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
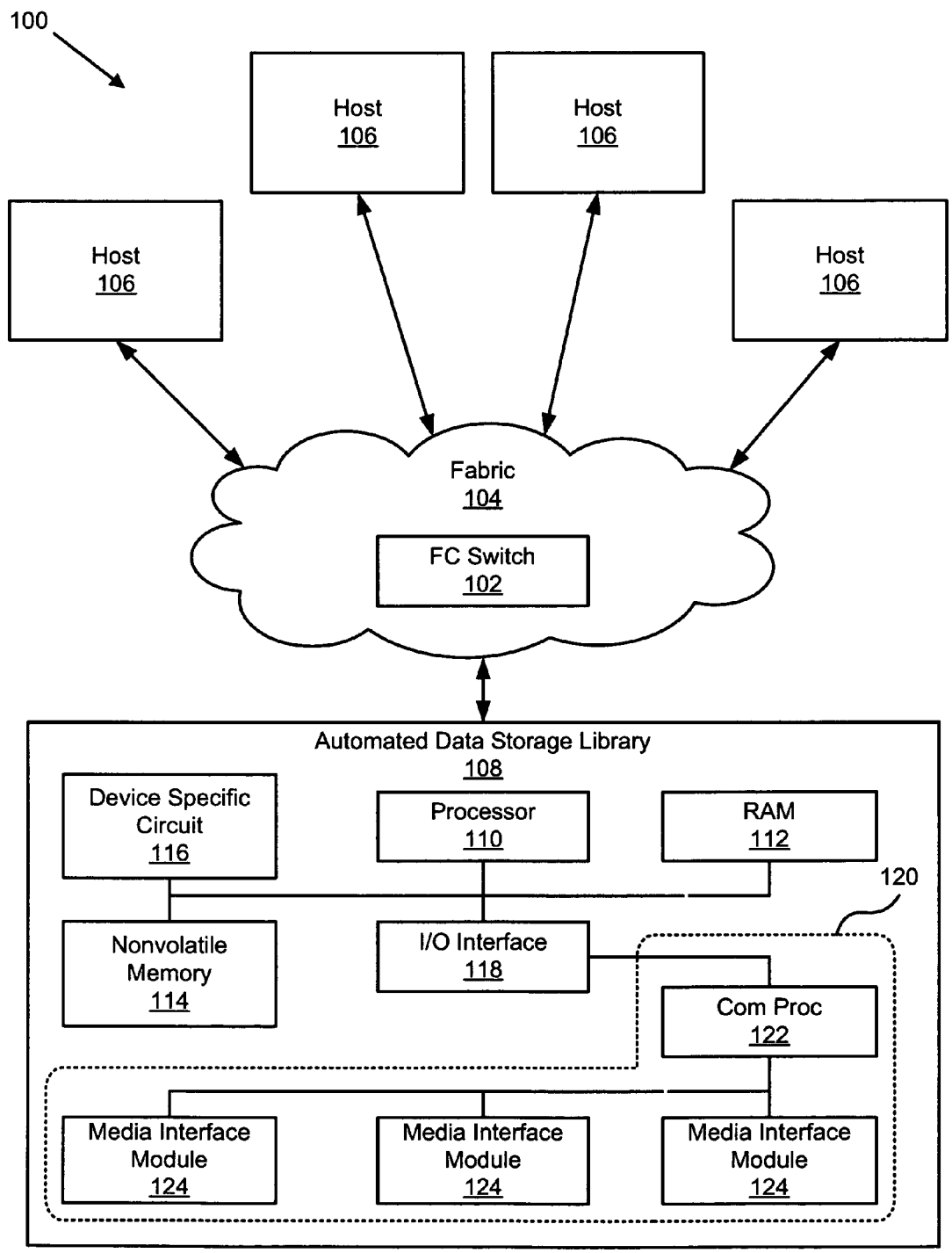
FIG. 1 is a schematic block diagram illustrating one embodiment of a storage area network in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 is a schematic block diagram graphically illustrating one embodiment of a storage area network (SAN) 100 in accordance with the present invention. In one embodiment, the SAN 100 comprises a switch-access-network, wherein at least one Fibre Channel (FC) switch 102 implements a FC switching fabric 104. In a further embodiment, the SAN 100 may be implemented using Small Computer Systems Interface (SCSI) protocol running over the FC fabric 104. Alternatively, the SAN 100 may be implemented over other protocols, such as, but not limited to, Infiniband FICON, TCP/IP, Ethernet, Gigabit Ethernet, or iSCSI.

In one embodiment, a plurality of host machines 106 is coupled to the fabric 104. The FC switch 102 may be configured to route I/O requests from the host 106 to an automated data storage library 108. Alternatively, the I/O requests may be routed through the Internet (not shown) using standard TCP/IP. The automated data storage library 108 may include a processor 110, RAM (Random Access Memory) 112, a nonvolatile memory 114, at least one device specific circuit 116, and an I/O interface 118. Alternatively, the RAM 112 and/or nonvolatile memory 114 may be embedded within the processor 110 as could the device specific circuit 116 and the I/O interface 118.

The processor 110 may be implemented as an off the shelf microprocessor, custom processor, Field Programmable Gate Array (FPGA), Application Specific Integrated Circuit (ASIC), discrete logic, etc. The RAM 112 may be configured to hold variable data, stack data, executable instructions, etc. The nonvolatile memory 114 may comprise any type of nonvolatile memory such as EEPROM, flash PROM, battery backup RAM, hard disk drive, or the like. The nonvolatile memory 114 is configured to hold the executable firmware and any nonvolatile data. The I/O interface 118 may be configured to interface the processor 110 with external devices (not shown). In one embodiment, the I/O interface 118 may comprise serial interfaces such as RS-232 or USB (Universal Serial Bus), SCSI, Fibre Channel, etc. In a further embodiment, the I/O interface 118 may comprise a wireless interface such as RF or Infrared.

The device specific circuit 116 provides additional hardware to enable the automated data storage library 108 to perform unique functions such as motor control of a cartridge gripper, etc. Control of such functions within automated storage libraries 108 is well known to those skilled in the art and will not be given further discussion herein. In a further embodiment, the automated data storage library 108 comprises a grid bus 120 having a communication processor 122 and a plurality of media interface modules 124. The grid bus 120, communication processor 122, and media interface modules 124 will be discussed in greater detail below with reference to FIGS. 5-8.

Figure 2:
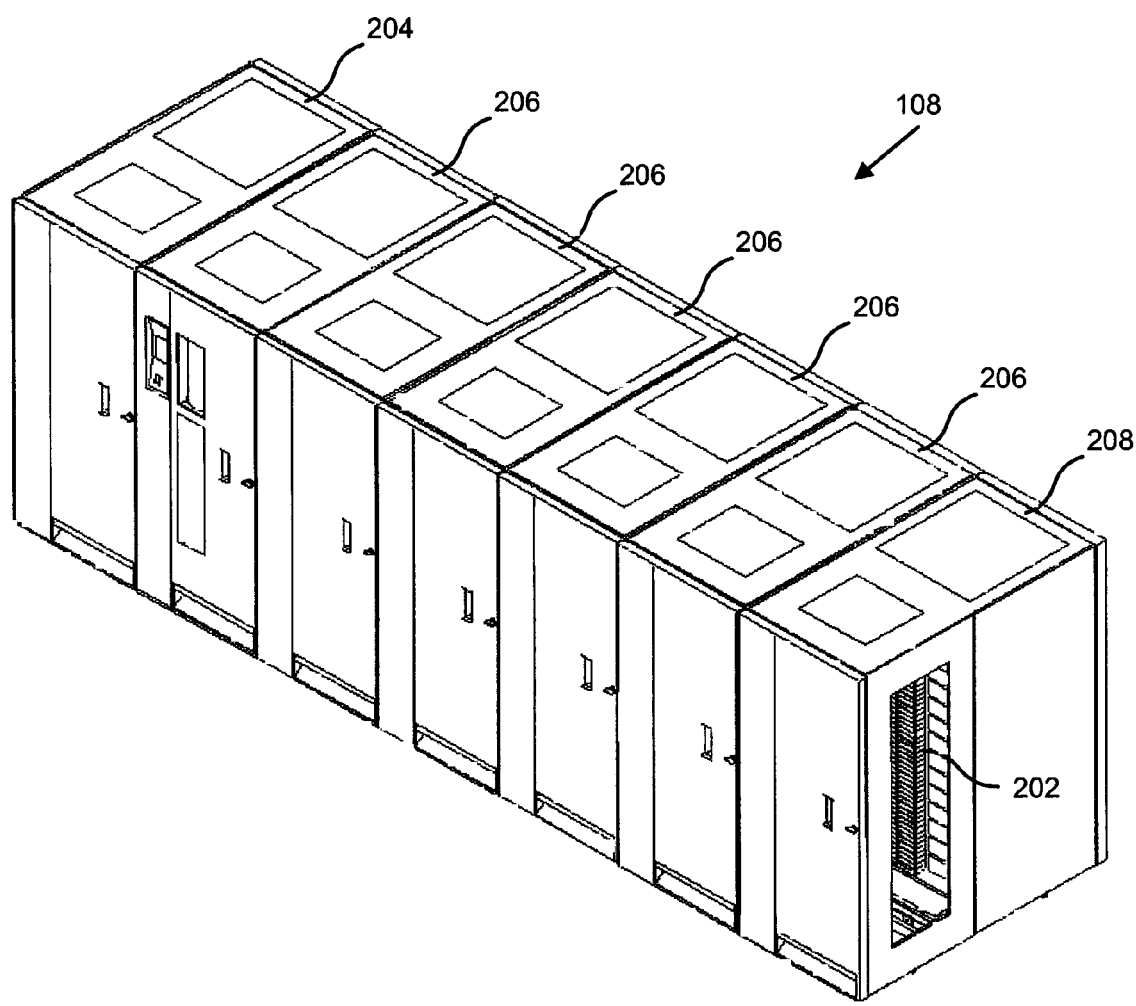
FIG. 2 is an isometric view of an automated data storage library adaptable to implement an embodiment of the present invention.

FIG. 2 illustrates the automated data storage library 108 which stores and retrieves data storage cartridges containing removable storage media in storage cells 202. It is noted that references to "removable storage media" herein also refer to data storage cartridges and, for purposes herein, the two terms are used synonymously. An example of an automated data storage library 108 which may implement the present invention, and has a configuration as depicted in FIG. 1, is the IBM 3584 UltraScalable Tape Library.

The library 108 of FIG. 2 comprises a left hand service bay 204, one or more storage frames 206, and a right hand service bay 208. A service bay 204, 208 is characterized by its designation as the location in which an accessor may "park" when not in use. Having a service bay 204, 208 at each end of the library 108 allows multiple accessors to each have full access to all of the storage cells 202 and drives within the intermediate storage frames 206. For example, one accessor may park out of the way in the left service bay 204 while a second accessor accesses a drive in the storage frame 206 adjacent to the left service bay 204. All of the service bays 204, 208 and storage frames 206 may be referred to as frames 204-208. As will be discussed, a frame 204-208 may comprise an expansion component of the library 108. Frames 204-208 may be added or removed to expand or reduce the size and/or functionality of the library 108. Frames 204-208 may comprise additional storage cells 202, drives, import/export stations, accessors, operator panels, etc, as will be discussed below.

Figure 3:
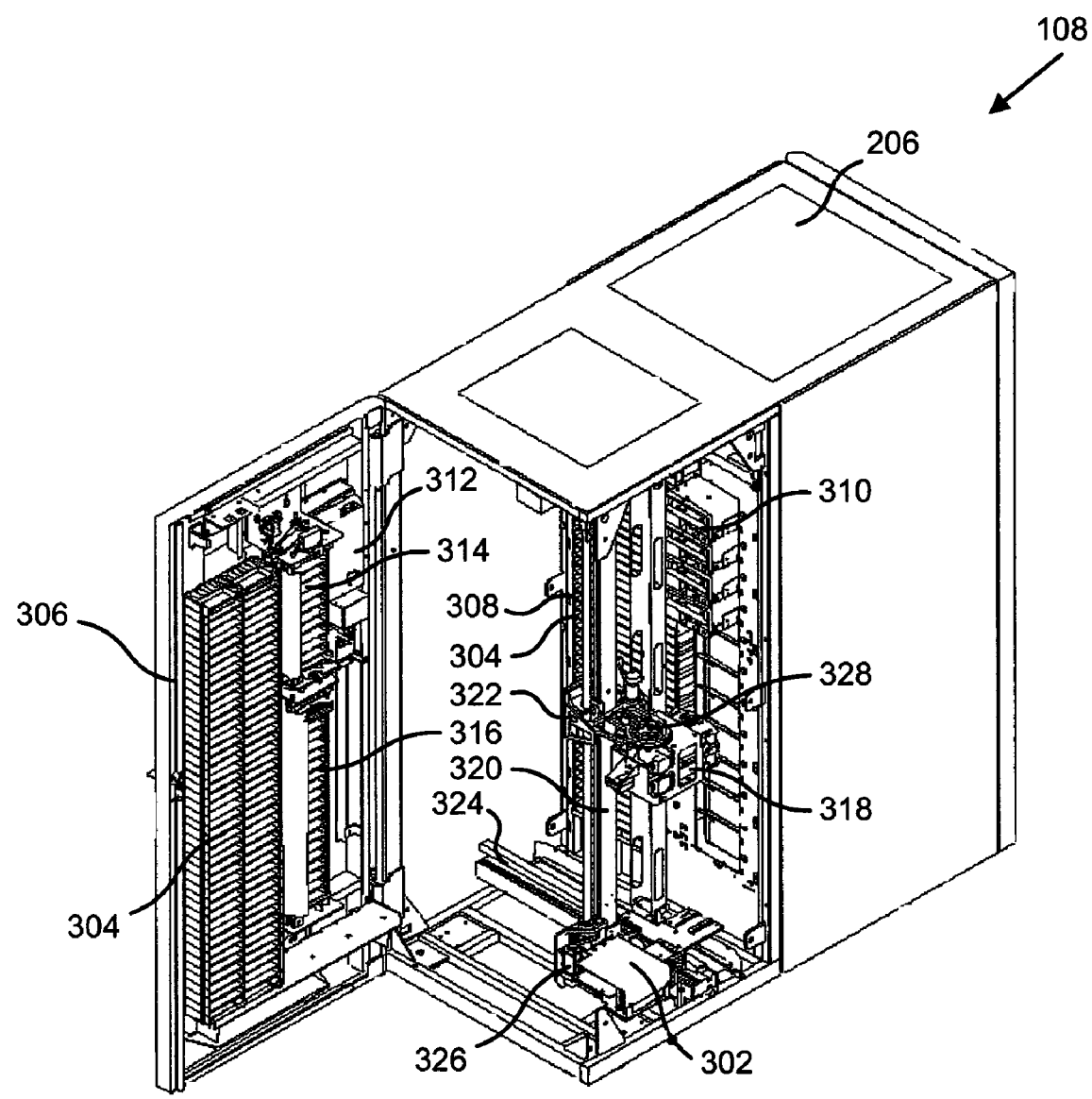
FIG. 3 is an isometric view of a storage frame, including an exemplary basic configuration of some internal components, of an automated data storage library.

FIG. 3 shows an example of a single storage frame 206, which is contemplated to be the minimum configuration of an automated data storage library 108. In this minimum configuration, there is only a single accessor 302 (i.e., there are no redundant accessors) and there are no service bays 204, 208. The library 108 is arranged for accessing data storage media in response to commands from at least one external host system (not shown). In one embodiment, the library 108 comprises a plurality of storage shelves 304; one front wall 306 and one rear wall 308 for storing data storage cartridges that contain data storage media; at least one data storage drive 310 for reading and/or writing data with respect to the data storage media; and the illustrated accessor 302 for transporting the data storage media between the plurality of storage shelves 304 and the data storage drive(s) 310. Both the storage cells 304 and the storage drives 310, as well as other locations suitable for holding data storage media, may be referred to as "data storage locations." The data storage drives 310 may be optical disk drives, magnetic tape drives, or other types of data storage drives as are used to read and/or write data with respect to the data storage media.

The storage frame 206 may optionally comprise an operator panel 312 or other user interface, such as a web-based interface, which allows a user to interact with the library 108. The storage frame 206 may optionally comprise an upper I/O station 314 and/or a lower I/O station 316, which allows data storage media to be inserted into the library and/or removed from the library without disrupting library operation. For example, a user may insert a storage media cartridge into one of the I/O stations 314, 316 while the front wall 306 of the storage frame 206 is closed. The I/O stations 314, 316 also may be referred to as "data storage locations." Further embodiments of the library 108 also may comprise one or more service bays 204, 208 and/or additional storage frames 206, each having storage cells 304 accessible by an accessor 302.

As described above, each of the storage frames 206 may be configured with different components depending upon the intended function. One configuration of storage frame 206 may comprise storage shelves 304, data storage drive(s) 310, and other optional components to store and retrieve data from the data storage cartridges. In a further embodiment, the storage frame 206 may be converted to a service bay 204, 208 within a larger automated data storage library 108. Conversely, a service bay 204, 208 may be converted into a storage frame 206, such as when additional frames 204-208 are added onto an existing library 108. The new frames 206 may be bolted onto the end of the existing service bay 204, 208. The existing service bay 204, 208 then may be converted into a storage frame 206 and filled with storage cells 304, drives 310, and the like. Alternatively, a service bay 204, 208 may already contain storage shelves 304 and there may be no conversion required.

In one embodiment, the accessor 302 comprises a gripper assembly 318 for gripping one or more data storage media and transporting the data storage media among the storage shelves 304 and drives 310. The gripper assembly 318 is mounted to a vertical rail 320 (also referred to as a "Y" rail) and may be transported vertically on the vertical rail 320 via a Y rail drive 322. The vertical rail 320 and gripper assembly 318, in turn, may be transported horizontally along a horizontal rail 324 (also referred to as an "X" rail) by an X rail drive 326. If multiple accessors 302 are installed in a single library 108, they may each run on an independent X rail(s) 324 or may run on the same X rail(s) 324. In a further embodiment, the gripper assembly 318 may rotate approximately 180 degrees via a rotational drive 328. In this way, the gripper assembly 318 may access the storage shelves 304 and I/O stations 314, 316 on the front wall 306, as well as the storage cells 304 and drives 310 on the rear wall 308.

Figure 4:
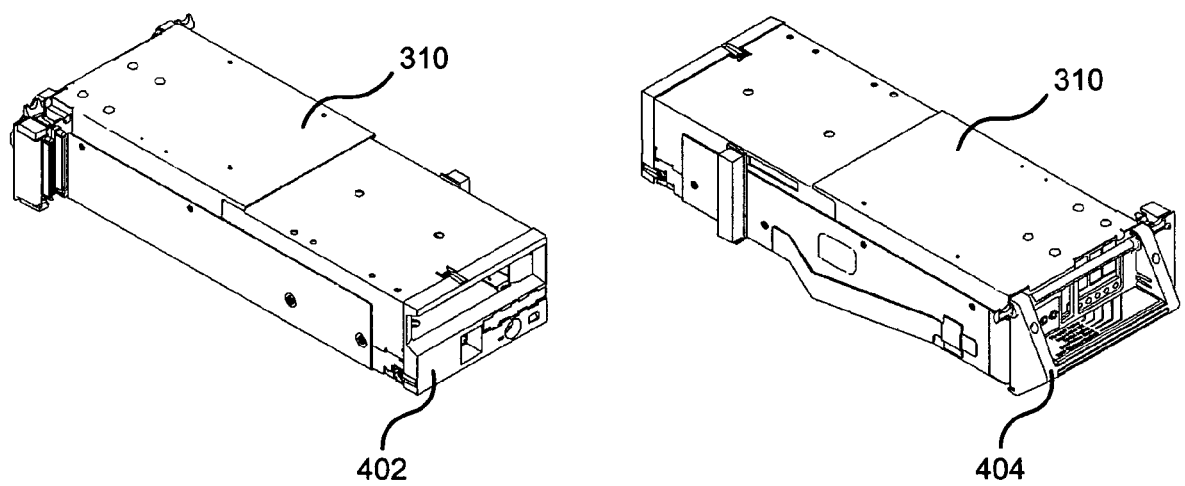
FIG. 4 is an isometric view of the front and rear of a data storage drive that may be used in an automated data storage library to store and/or retrieve data.

FIG. 4 illustrates one embodiment of a data storage drive 310 that may be installed in the automated data storage library 108 of FIG. 1. Specifically, FIG. 4 depicts the front 402 and rear 404 of a data storage drive 310. In the depicted embodiment, the data storage drive 310 comprises a removable media Linear Tape Open (LTO) tape drive mounted in a drive canister. The data storage drive 310 may comprise any removable storage media drive such as, but not limited to, magnetic or optical disk drives, electronic media drives, or other computer readable removable media drives.

Figure 5:
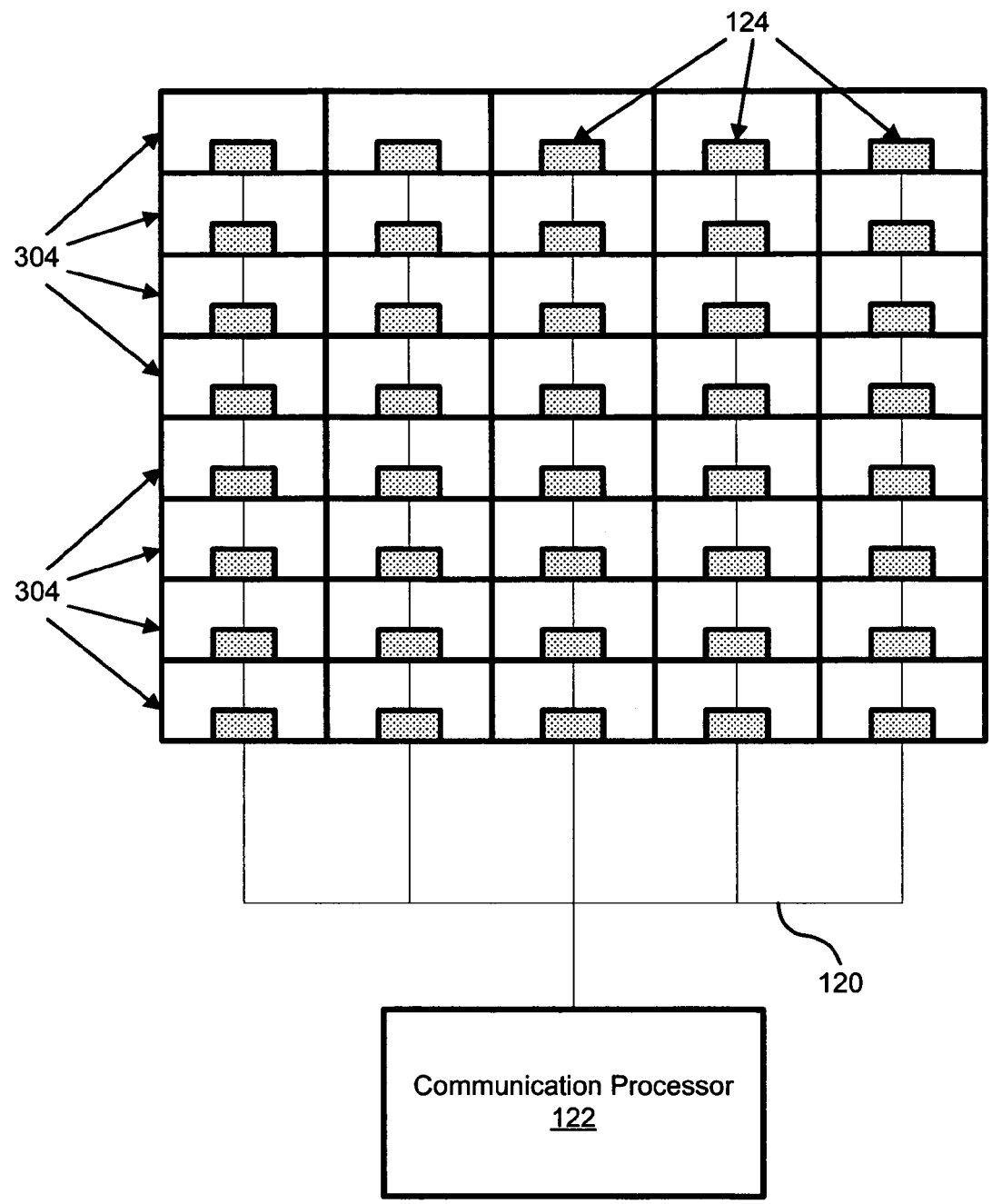
FIG. 5 is a schematic block diagram graphically illustrating one embodiment of a plurality of storage cells in accordance with the present invention.

FIG. 5 is a schematic block diagram graphically illustrating one embodiment of the plurality of storage cell 304. In one embodiment, each storage cell 304 comprises the media interface module 124 coupled to the common grid bus 120. The communication processor 120 may also be coupled to the grid bus 120. In a further embodiment, the communication processor 122 is configured to communicate with each storage cell 304. The grid bus 120, media interface module 124, and the communication processor 122 enable the automated data storage library 108 to quickly inventory the removable storage media present within the automated data storage library 108 without having to remove the removable storage media.

Figure 6:
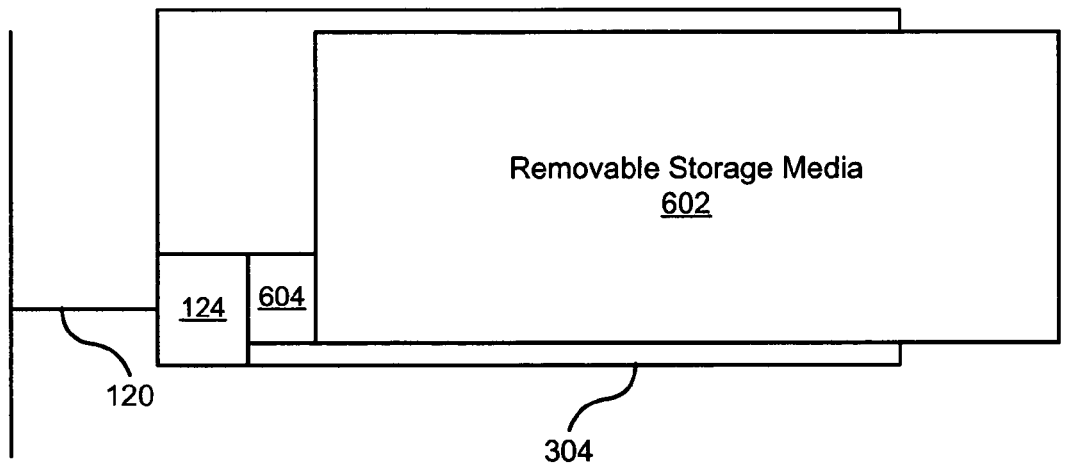
FIG. 6 is a schematic block diagram graphically illustrating one embodiment of a storage cell having a physical connection to a communications network in accordance with the present invention.

FIG. 6 is a schematic block diagram graphically illustrating one embodiment of the storage cell 304 having a removable storage media device 602 in accordance with the present invention. In one embodiment, the removable storage media device 602 comprises a removable hard disk drive 602. One example of a removable hard disk drive suitable for use with the present invention is described in U.S. Pat. No. 6,545,865, which is hereby incorporated by reference into this document. The removable hard disk drive 602 may be configured to be stored within the storage cell 304. In a further embodiment, the hard disk drive 602 comprises a communication module 604 configured to interface with the media interface module 124.

Figure 7:
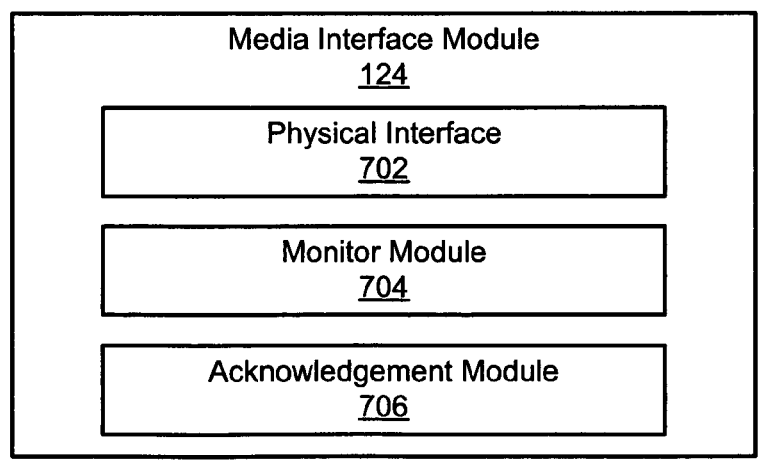
FIG. 7 is a schematic block diagram graphically illustrating one embodiment of a media interface module in accordance with the present invention.

FIG. 7 is a schematic block diagram graphically illustrating one embodiment of the media interface module in accordance with the present invention. In one embodiment, the media interface module 124 comprises a physical interface 702, a monitor module 704, and an acknowledgment (ACK) module 706. The physical interface 702 may comprise an RS-232 serial interface. The monitor module 704 is configured to monitor data packets sent from the communication processor 122 on the grid bus 120. Data packets may be configured with identifying information unique to each removable storage media 602. Upon intercepting a data packet containing matching identifying information, the ACK module 706 may transmit the acknowledgment to the communication processor 122 (refer to FIGS. 11 and 12).

Figure 8:
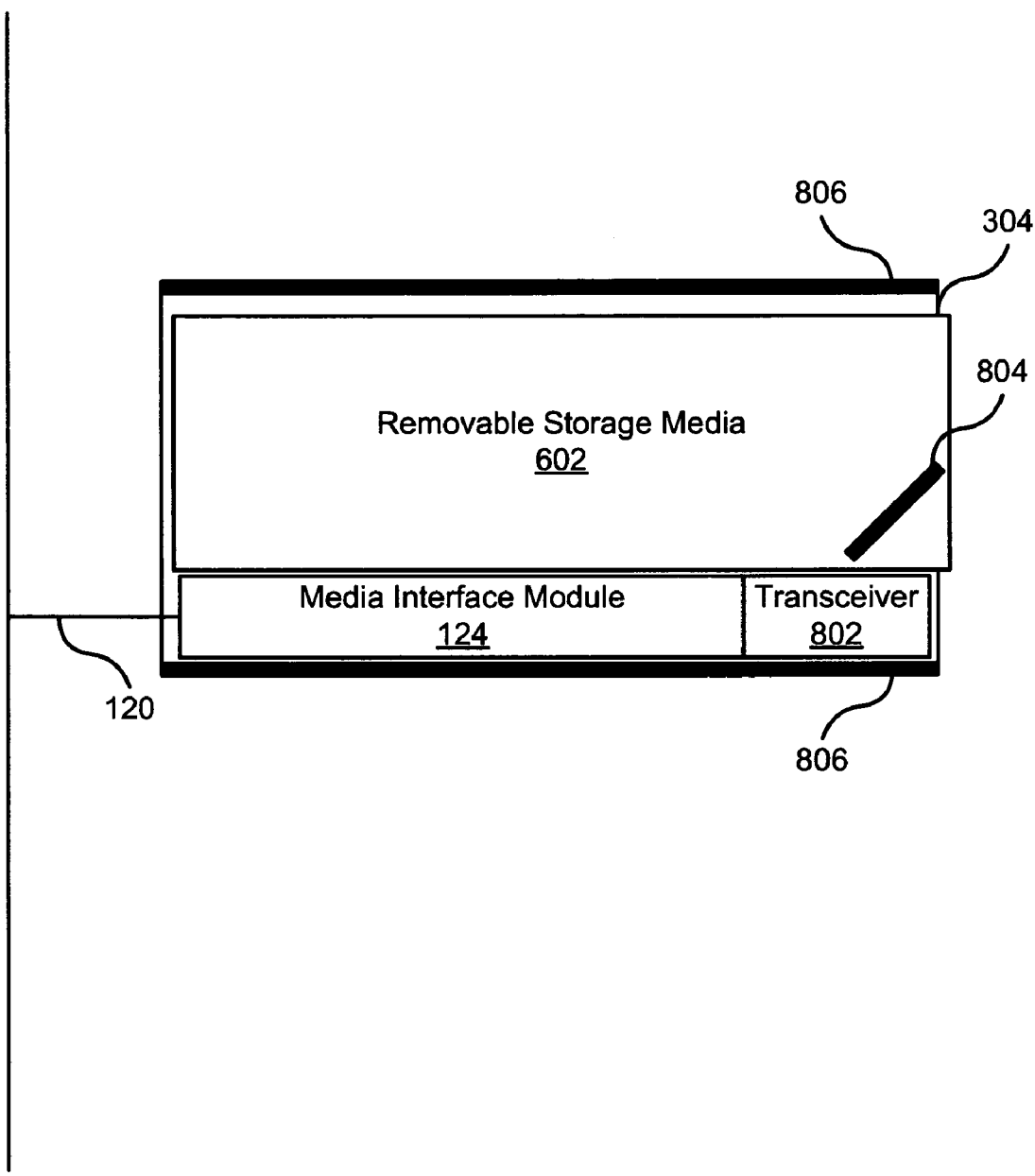
FIG. 8 is a schematic block diagram graphically illustrating one embodiment of a storage cell having a wireless connection to a communications network in accordance with the present invention.

FIG. 8 is a schematic block diagram graphically illustrating an alternative embodiment of the storage cell 304 having a transceiver 802 for communicating wirelessly with the removable storage device 602. The transceiver 802 is coupled to the media interface module 124 and configured to convert a wireless protocol to the protocol in use on the grid bus 120. In the depicted embodiment, the removable storage media 602 comprises a memory module 804 configured to maintain storage information and communicate wirelessly with the transceiver 802. In the depicted embodiment, the memory module 804 has an orientation of about 45 degrees with respect to the removable storage media 602. One example of removable storage media 602 having the memory module 804 is a Linear Tape Open (LTO) tape cartridge.

In a further embodiment, the storage cell 304 may also comprise a plurality of electromagnetic interference (EMI) shields 806. The EMI shields 806 are configured to prevent the transceiver 802 from communicating with memory module 804 in adjacent storage cells 304. Alternatively, the transceiver 802 may be configured to communicate with a plurality of surrounding memory modules 804. The EMI shields 806 may comprise an aluminum or copper shield. Preventing electromagnetic interference is well known to those skilled in the art and will not be given further discussion herein.

Figure 9:
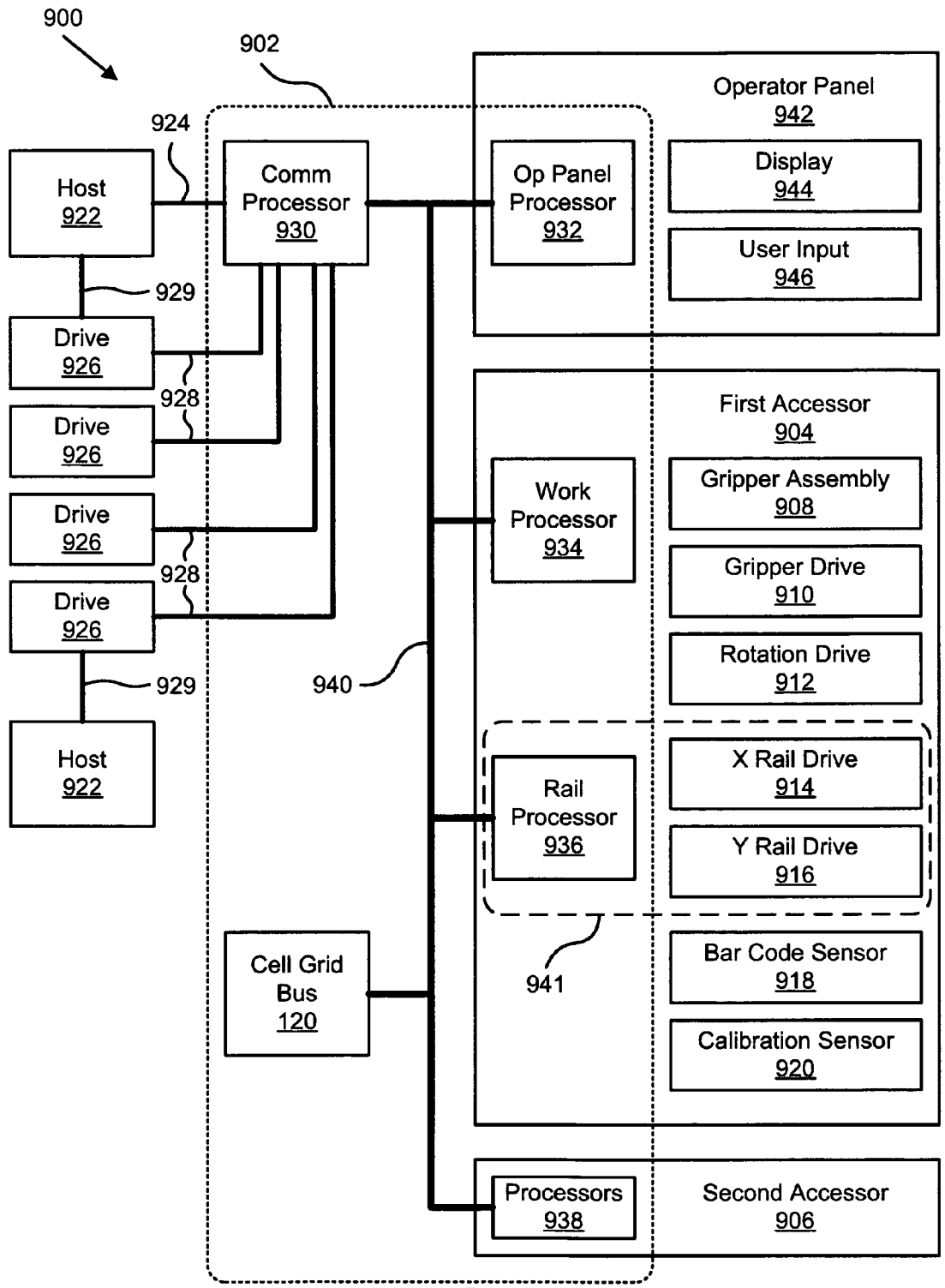
FIG. 9 is a schematic block diagram graphically illustrating one embodiment of a distributed control system within an automated data storage library adaptable to implement an embodiment of the present invention.

FIG. 9 illustrates an embodiment of an automated data storage library 900 that is substantially similar to the automated data storage library 108 of FIG. 1. The illustrated library 900 employs a distributed control system 902 that includes a plurality of processor nodes. An example of an automated data storage library 900 which may implement the distributed control system 902 is the IBM 3584 UltraScalable Tape Library. For a more detailed background of certain embodiments of a distributed control system 902 incorporated in an automated data storage library 900, refer to U.S. Pat. No. 6,356,803 entitled "Automated Data Storage Library Distributed Control System," which is incorporated herein by reference.

While the automated data storage library 900 is described as employing a distributed control system 902, the present invention may be implemented in various automated data storage libraries 900 regardless of control configuration, such as, but not limited to, an automated data storage library 900 having one or more library controllers that are not distributed. In further embodiments of the invention, the distributed control system 902 may be distributed among various components of a library 900. For example, components may be located within the service bays 204, 208 or the storage frames 206. Still further, individual components may be located on the operator panel 312, the accessors 302, and so forth.

The illustrated library 900 also comprises a first accessor 904 and a second accessor 906. The first accessor 904 and second accessor 906 are substantially similar to the accessor 302 of FIG. 3 and its features. As shown, the first accessor 904 comprises a gripper assembly 908 as described above, a gripper drive 910, a rotation drive 912, an X rail drive 914, and a Y rail drive 916. Additionally, the first accessor 904 includes a bar code sensor 918 and a calibration sensor 920. The bar code sensor 918 also may be referred to as a reading system. The second accessor 906 is substantially similar to the first accessor 904; however, for clarity and ease of description, the components of the second accessor 906 are not shown.

In the exemplary library 900, the first accessor 904 and the second accessor 906 move their respective gripper assemblies 908 in at least two directions, called the horizontal "X" direction and vertical "Y" direction, as described above, to retrieve and grip, or to deliver and release a data storage cartridge (hereinafter "cartridge") at the storage cells 304 and to load and unload the cartridges at the data storage drives 310.

In one embodiment, the automated data storage library 900 receives operational commands from one or more host systems 922. The host systems 106, such as host servers, communicate with the library 900 directly, e.g., on a communications channel 924 or through one or more control ports (not shown). In another embodiment, the host systems 922 may communicate with the communication processor node 930 through one or more data storage drives 926 on one or more communication channels 928, 929. The data storage drives 926 are substantially similar to the data storage drives 310 described above.

The hosts 922 may be connected to the data storage drives 926 via a communication channel 929. In one embodiment, the communication channel 929 may be a small computer system interface (SCSI) bus. Alternately, the communication channel 929 may be a Fibre Channel bus, which is a high speed serial data interface that allows transmission over greater distances than the SCSI bus systems. In one embodiment, the data storage drives 926 may be in close proximity to the communication processor node 930 and the communication channel 928 may employ a short distance communication scheme, such as SCSI, or a serial connection, such as RS-422. The data storage drives 926 are also individually coupled to the communication processor node 930 by means of communication channels 928. Alternatively, the data storage drives 926 may be coupled to the communication processor node 930 through one or more networks, such as a common bus network. As is known to those of skill in the art, various communication arrangements may be employed for communication among the hosts 922, the data storage drives 926, and the communication processor node 930.

The host systems 922 are configured to provide operational commands to access a particular data storage cartridge and move the cartridge, for example, between the storage cells 304 and the data storage drives 926. The commands are typically logical commands identifying the cartridge and/or logical locations for accessing the cartridge. The terms "commands" and "work requests" are used interchangeably herein to refer to such communications from the host system 922 to the library 900 that are intended to result in accessing a particular cartridge within the library 900.

In one embodiment, the exemplary library 900 is controlled by the distributed control system 902. The distributed control system 902 receives the logical commands from one or more hosts 922, determining the required actions, and converting the actions to physical movements of the first accessor 904 and/or second accessor 906. In the illustrated embodiment, the distributed control system 902 comprises a plurality of processor nodes, each having one or more processors. Specifically, the distributed control system 902 includes a communication processor node 930, an operator panel processor node 932, a work processor node 934, and a rail processor node 936. The distributed control system 902 may further include additional processor nodes 938, similar to the communication processor node 930, operator panel processor node 932, work processor node 934 and the rail processor node 936.

In one embodiment, the communication processor node 930 may be located in a storage frame 106. The communication processor node 930 provides a communication link for receiving the operational commands from a host 922, either directly or through the drives 926, or via at least one external interface, e.g., coupled to communication channel 924. The communication processor node 930 may additionally provide a communication link 928 for communicating with the data storage drives 926. In one embodiment, the communication processor node 930 may be located in a storage frame 206, for example, close to the data storage drives 926.

In a further embodiment of the distributed control system 902, one or more work processor nodes 934 are provided, which may be located at the first accessor 904. The work processor nodes 934 are coupled to the communication processor node 930 via a communications network 940. Each work processor node 934 may respond to received commands that are broadcast to the work processor nodes 934 from any communication processor node 930. Additionally, the work processor nodes 934 also may direct the operation of the accessors 904, 906, providing motion control or move commands, for example, to the gripper assembly 908, the gripper drive 910, the rotation drive 912, and the rail processor node 936.

The rail processor node 936 also may be coupled to the network 940. The rail processor node 936 is responsive to the move commands received from the work processor node 934, operating the X rail drive 914, and the Y rail drive 916 to position the gripper assembly 908. Together, the rail processor node 936, the X rail drive 914, and the Y rail drive 916 may be referred to as an "XY system" 941.

In the depicted embodiment, an operator panel processor node 932 is provided at the optional operator panel 942. The operator panel processor node 932 is configured to provide an interface for communicating between the operator panel 942 and the communication processor node(s) 930, the work processor node(s) 934, and the rail processor node(s) 936. In one embodiment, the operator panel 942 also comprises a display 944 and a user input module 946. Together, the display 944 and the user input module 946 are configured to receive commands from a user and display system information.

As described above, a communication network 940 is provided within the distributed control system 902, coupling the various processor nodes 930-938. In one embodiment, the communication network 940 may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other types of networks, such as Ethernet, or a wireless network system, such as RF or infrared, may be employed in the library 900 as is known to one of skill in the art. In addition, multiple independent connections and/or communication networks 940 may also be used to couple the various processor nodes 930-938. One example of such a communication network may be the grid bus 120. Although not depicted, the grid bus 120 and the plurality of media interface module 124 may be coupled to the communication network 940 such that the communication processor 122 may communicate with the plurality of cartridges.

An automated data storage library 900 typically comprises one or more controllers to direct the operation of the automated data storage library 900. Host computers 922 and data storage drives 926 typically comprise similar controllers. A controller may take many different forms and may comprise, for example but not limited to, an embedded system, a distributed control system, a personal computer, or a workstation. As used herein, the term "controller" is intended in its broadest sense as a device that contains at least one processor, as such term is defined herein.

Although not depicted herein, a typical controller includes a processor, an electronic memory device such as RAM (Random Access Memory), a nonvolatile memory device, device specific circuits, and I/O interface (refer to FIG. 1). Alternatively, the RAM and/or nonvolatile memory may be contained in the processor, as could the device specific circuits and the I/O interface. The processor may comprise, for example, an off-the-shelf microprocessor, custom processor, FPGA (Field Programmable Gate Array), ASIC (Application Specific Integrated Circuit), discrete logic, or the like.

The RAM (Random Access Memory) is typically used to hold variable data, stack data, executable instructions, and the like. The nonvolatile memory may comprise any type of nonvolatile memory such as, but not limited to, EEPROM (Electrically Erasable Programmable Read Only Memory), flash PROM (Programmable Read Only Memory), battery backup RAM, and hard disk drives. The nonvolatile memory is typically used to hold the executable firmware and any nonvolatile data. The I/O interface comprises a communication interface that allows the processor to communicate with devices external to the controller. Examples may comprise, but are not limited to, serial interfaces such as RS-232, USB (Universal Serial Bus), Ethernet, SCSI (Small Computer Systems Interface), and so forth.

The device specific circuits provide additional hardware to enable the controller to perform unique functions such as, but not limited to, motor control of a cartridge gripper assembly 908. The device specific circuits may comprise electronics that provide, by way of example but not limitation, Pulse Width Modulation (PWM) control, Analog to Digital Conversion (ADC), Digital to Analog Conversion (DAC), etc. In addition, all or part of the device specific circuits may reside outside the controller.

Figure 10:
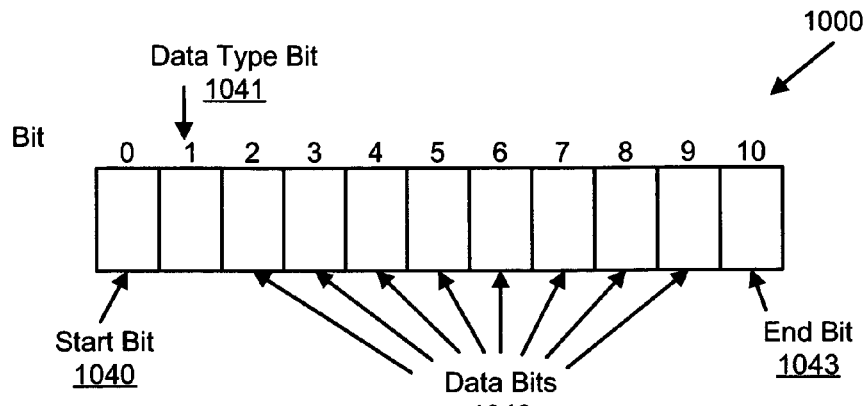
FIG. 10 is a schematic block diagram graphically illustrating one embodiment of a data packet adaptable to implement an embodiment of the present invention.

Referring now to FIG. 10, shown therein is a schematic block diagram graphically illustrating the data packet 1000 that may be transmitted by the communication processor 122 in accordance with the present invention. In one embodiment, the data packet 1000 comprises nine bits of data. The data packet 1000 may comprise a Bit-0 1040, configured to signal the start bit, Bit-1 1041 configured to specify whether data, commands, or an address is transferred, Bit 2-9 1042, and Bit 10 1043 configured to signal the end of the data packet. In one embodiment, a value of 1 in Bit 2 1042 may indicate an address is contained in the package. In a further embodiment, Bit-2 through bit-9 1042 are data bits, where the actual data according to the protocol is being contained.

Using a unique address for each storage cell 304 allows the communications processor 122 to communicate with each storage cell 304. In order to extend the limitation for addresses given by the 8 bits, the packet can incorporate a semantic which links multiple packets together. For example, if Bit 1 1041 is "1" (denoting an address) Bit 2 1042 may be used to indicate that the next packet is linked to the current packet). This allows almost unlimited chaining of packets and the addressability becomes unlimited. A similar data packet structure may be used to issue commands and send and receive data. Data that may be retrieved from a stored removable storage media include media usage information, media quality information, and media meta information. For example, the amount of data written, amount of data read, number of media cartridge loads, write retry count, read retry count, volume serial number, manufacturer and date, medium type, file structure, and partitions on the media.

The following schematic flow chart diagrams are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbology employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 11:
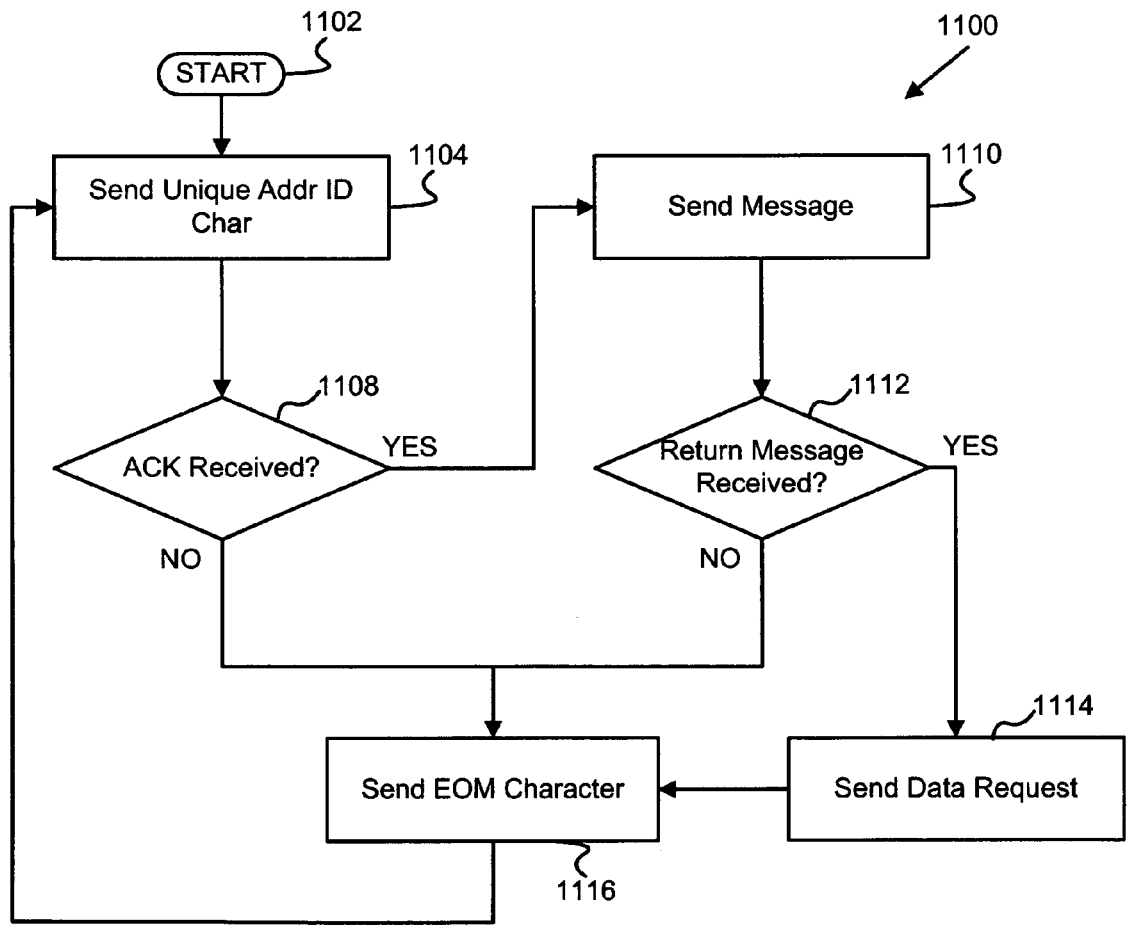
FIG. 11 is a schematic flow chart diagram illustrating one embodiment of a method for transmitting a unique data packet in accordance with the present invention.

FIG. 11 is a schematic flow chart diagram illustrating a method 1100 for transmitting a unique data packet 1000 in accordance with the present invention. The method 1100 starts 1102 and the communication processor 122 sends 1104 the data packet 1000 having a unique address identification. The communication processor 122 then waits for an acknowledgement from the corresponding media interface module 124. If an acknowledgment is received 1108, the communication processor 122 may then send 1110 a message to the media interface module 124. If the communication processor 122 receives 1112 a return message, the communication processor may request 1114 additional information (refer to FIG. 10). The communication processor 122 then sends 1116 and End Of Message (EOM) character indicating that the communication with the specified media interface module 124 has ended, and the media interface module 124 may continue to monitor the grid bus 120 for subsequent matching data packets 1000. The communication processor 120 then repeats the method 1100 for the next storage cell 304.

If no acknowledgement is received 1108 by the communication processor 120, the communication processor 120 sends 1116 the EOM message and proceeds to send 1104 the subsequent unique data packet 1000. Similarly, if the communication processor 120 does not receive 1112 the return message, the communication processor 120 sends 1116 the EOM message and continues as described above.

Figure 12:
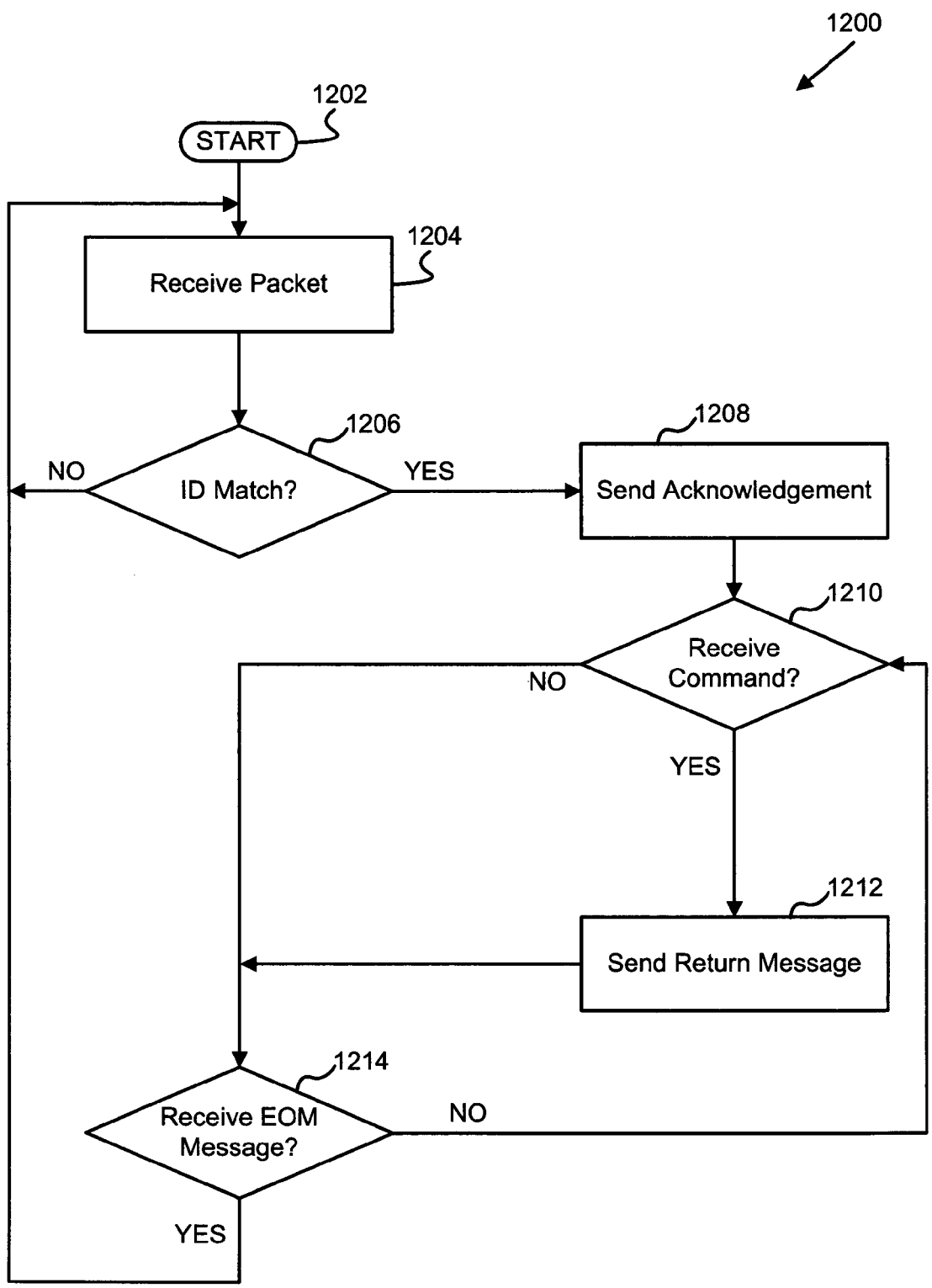
FIG. 12 is a schematic flow chart diagram graphically illustrating one embodiment of a method for monitoring and responding to unique data packets in accordance with the present invention.

FIG. 12 is a schematic flow chart diagram graphically illustrating one embodiment of a method 1200 for monitoring and responding to unique data packets 1000 in accordance with the present invention. The method 1200 starts 1202 and the media interface module 124 receives 1204 the data packet 1000. If the data packet 1000 contains a matching 1206 identification the media interface module 124 sends 1208 the acknowledgement and waits for further instruction from the communication processor 120. Upon receiving 1210 a command, the media interface module 124 sends 1212 the return message. Subsequently, if the media interface module receives 1214 the EOM message the media interface module 124 returns to monitoring the grid bus 120 for data packets 1000 having matching identification information.

If the identification information does not match 1206, the media interface module continues monitoring data packets 1000. Likewise, if after matching 1206 the identification information, the media interface module 124 does not receive 1210 the command message, the media interface module continues monitoring the data packets 1000 for data request packets or the EOM message.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for communicating with stored removable storage media, the apparatus comprising:
    an automated data storage library having a plurality of storage cells configured to engage removable storage media, each storage cell having a media interface module configured to communicate with the removable storage media, wherein the removable storage media is read and written with a drive disposed outside of the storage cells;
    a communication processor module configured to communicate with the media interface module of each storage cell; and
    a communications network configured to couple the media interface modules and the communication processor module, wherein each media interface module comprises a radio frequency (RF) module coupled to the communications network and configured to communicate wirelessly with a second RF module in each removable storage media, the second RF module identifying the removable storage media without mounting the removable storage media in the drive.

2. The apparatus of claim 1, wherein the media interface module comprises a physical connection configured to interface with a second physical connection of the removable storage media.

3. The apparatus of claim 2, wherein the physical connection further comprises an RS-232 standard interface connection.

4. The apparatus of claim 1, wherein the communications network further comprises a grid bus.

5. The apparatus of claim 1, wherein the communication processor is further configured to selectively transmit and receive unique identifying information for each removable storage media.

6. The apparatus of claim 1, wherein the media interface module is further configured to monitor the communications network and transmit an acknowledgement to the communication processor module in response to received unique identifying information.

7. The apparatus of claim 1, wherein the communication processor module is further configured to transmit a data packet comprising ten bits, wherein a first bit signals a start bit, a second bit specifies if the data packet is an address, and ninth and tenth bits signal an end of the data packet.

8. A system for communicating with stored removable storage media, the system comprising:
    an automated data storage library;
    a host configured to communicate a data access request to the data storage library;
    a first accessor and a second accessor within the data storage library, the first and second accessors configured to facilitate the data access request;
    the automated storage library having a plurality of storage cells configured to engage removable storage media, each storage cell having a media interface module configured to communicate with the removable storage media, wherein the removable storage media is read and written with a drive disposed outside of the storage cells;
    a communication processor module configured to communicate with the media interface module of each storage cell; and
    a communications network configured to couple the media interface modules and the communication processor module, wherein each media interface module comprises a RF module coupled to the communications network and configured to communicate wirelessly with a second RF module in each removable storage media, the second RF module identifying the removable storage media without mounting the removable storage media in the drive.

9. The system of claim 8, wherein the media interface module comprises a physical connection configured to interface with a second physical connection of the removable storage media.

10. The system of claim 8, wherein the physical connection further comprises an Electronic Industries Alliance (EIA) 232 standard interface connection.

11. The system of claim 8, wherein the communications network further comprises a grid bus.

12. The system of claim 8, wherein the communication processor is further configured to selectively transmit and receive unique identifying information for each removable storage media.

13. The system of claim 8, wherein the media interface module is further configured to monitor the communications network and transmit an acknowledgement to the communication processor module in response to received unique identifying information.

14. The system of claim 8, wherein the communication processor module is further configured to transmit a data packet comprising ten bits, wherein a first bit signals a start bit, a second bit specifies if the data packet is an address, and ninth and tenth bits signal an end of the data packet.

15. A computer readable storage medium tangibly embodying a program of machine-readable instructions executable by a digital processing apparatus to perform operations to communicate with stored removable storage media, the operations comprising:
    communicate with removable storage media, wherein the removable storage media is read and written with a drive disposed outside of a plurality of storage cells;
    communicate with a plurality of media interface modules, each media interface module coupled to a storage cell; and
    couple the media interface modules and a communication processor module, wherein each media interface module comprises a RF module coupled to a communications network and configured to communicate wirelessly with a second RF module in each removable storage media, the second RF module identifying the removable storage media without mounting the removable storage media in the drive.

16. The computer readable storage medium of claim 15, wherein the instructions further comprise operations to interface a first physical connection with a second physical connection of the removable storage media.

17. The computer readable storage medium of claim 15, wherein the instructions further comprise operations to wirelessly couple the media interface module to the communications network.

18. The computer readable storage medium of claim 15, wherein the instructions further comprise operations to selectively transmit and receive unique identifying information for each removable storage media.

19. The computer readable storage medium of claim 15, wherein the instructions further comprise operations to monitor the communications network and transmit an acknowledgement to the communication processor module in response to received unique identifying information.

20. The computer readable storage medium of claim 15, wherein the communication processor module is further configured to transmit a data packet comprising ten bits, wherein a first bit signals a start bit, a second bit specifies if the data packet is an address, and ninth and tenth bits signal an end of the data packet.

* * * * *